United States Patent [19]

Tsuchiya et al.

[11] 4,414,259

[45] Nov. 8, 1983

[54] HEAT-SENSITIVE RECORD MATERIAL

[75] Inventors: Hiroshi Tsuchiya, Hino; Hitoshi Yamahira, Takatsuki; Takeshi Murakami, Osaka, all of Japan

[73] Assignee: Kanzaki Paper Manufacturing Co., Ltd., Hyogo, Japan

[21] Appl. No.: 392,809

[22] Filed: Jun. 28, 1982

Related U.S. Application Data

[63] Continuation of Ser. No. 151,759, May 20, 1980, abandoned.

[30] Foreign Application Priority Data

May 23, 1979 [JP] Japan .................................. 54-64203

[51] Int. Cl.[3] .............................................. B32B 5/16

[52] U.S. Cl. .................................... 428/207; 428/323; 428/913

[58] Field of Search ................ 428/207, 913, 263, 323

[56] References Cited

U.S. PATENT DOCUMENTS

| | | | |
|---|---|---|---|
| 4,032,690 | 6/1977 | Kohmura et al. | 428/263 |
| 4,168,845 | 9/1979 | Oeda et al. | 428/913 X |
| 4,246,312 | 1/1981 | Kosaka | 428/913 X |

FOREIGN PATENT DOCUMENTS

| | | | |
|---|---|---|---|
| 52-20142 | 6/1977 | Japan | 428/913 X |

*Primary Examiner*—Thomas J. Herbert, Jr.
*Attorney, Agent, or Firm*—Morgan, Finnegan, Pine, Foley & Lee

[57] ABSTRACT

The color developing layer of the heat-sensitive record material has a surface roughness of an Ra smaller than 1.2 microns and a gloss smaller than 25%.

6 Claims, No Drawings

HEAT-SENSITIVE RECORD MATERIAL

This is a continuation of application Ser. No. 151,759 filed May 20, 1980, now abandoned.

BACKGROUND OF THE INVENTION

This invention relates to a heat-sensitive record material and particularly to a heat-sensitive record material having a color developing layer on which sharp color images can be developed when subjected to a thermal printing treatment. This invention also relates to a method for the production of the heat-sensitive record material of such a kind like that.

There has heretofore been known a heat-sensitive record material which utilizes color reaction between an electron-donating color forming material (hereinafter referred to as "color former") and an electron-accepting acidic reactant material (hereinafter referred to as "acceptor") which the two components being thermally brought into intimate contact with each other to produce a developed color image.

One of the most typical heat transmission systems for developing a color image on the above mentioned heat-sensitive record material is to transfer heat to the heat-sensitive record material through the utilization of a thermal head having a number of electric resistance heating elements in the form of a dot matrix through which Joule heat produced by electric current pulses in response to signals to be recorded can be transmitted to the surface of the heat-sensitive record material when the thermal head is in close contact with the heat-sensitive record material.

In this type of heat transmission a sharp record image can only be obtained by developing a color image exactly corresponding to the heated dots as heating elements of the thermal head.

It is conventional to smooth the color developing layer surface of a heat-sensitive record material by a calendering treatment with use of a supercalender or gloss calender to improve the affinity of the color developing layer surface to a thermal head. In Japanese Patent Publication No. 20,142 of 1977 it was proposed to treat the color developing layer surface of a heat-sensitive record material so as to have a Bekk surface smoothness of 200 to 1000 seconds. U.S. Pat. No. 4,032,609 issued June 28, 1977 discloses a heat-sensitive record material having a Bekk surface smoothness of 100 to 500 seconds. However, a color image exactly corresponding to the heated dots of a thermal head cannot always be obtained by a mere calendering treatment to achieve such a high Bekk surface smoothness as disclosed in those patent specifications since usually each of the dots of a thermal head has such an extremely small size as about 200 microns. In many cases during repetition of heating and cooling the thermal head some molten ingredients of the heat-sensitive composition of the record material are deposited and piled on the thermal head. This "piling" phenomenon results in producing blurred color images having a reduced density. Also "sticking" between the color developing surface and the thermal head occurs. "Sticking" involves a peeling-off noise and results in producing an undesirable deformed color image. In addition, the higher the Bekk surface smoothness, the more glossy the surface of the record material. The record material having an extremely high gloss is of no commercial value because of its unnatural appearance.

The primary object of the invention is to provide an improved heat-sensitive record material in which "piling" and "sticking" can be prevented to the utmost extent with the result that a sharp and clear color image can be developed exactly according to the heated dots of a thermal head.

Another object of the invention is to provide an improved heat-sensitive record material which can satisfactorily meet the requirements of recording machines and implements.

A further object of the invention is to provide an improved heat-sensitive record material which has a natural appearance and is of a high commercial value.

A still further object of the invention is to provide an improved method for the production of the heat-sensitive record material of such the kind.

Other objects and advantages of the invention will be apparent from the following detailed description.

SUMMARY OF THE INVENTION

The heat-sensitive record material according to the invention comprises a base sheet and a color developing layer formed on at least one surface of said base sheet. The color developing layer comprises color former and acceptor which is reactive with said color former material to develop a color. The color developing layer has a surface roughness of an Ra smaller than 1.2 microns and a gloss value smaller than 25%. Preferably, the surface roughness Ra may be within the range of 1.1 microns to 0.6 microns and the gloss value may be within the range of 20 to 10%.

The heat-sensitive record material of such the kind as described is obtained by the steps of preparing a coating composition comprising finely divided particulate color former material, finely divided particulate acceptor which is reactive with said color former material to develop a color and a binder, coating said coating composition at least one surface of a base sheet through the utilization of the blade coating technique to form a color developing layer, subjecting the surface of said color developing layer to a calendering treatment whereby said color developing layer has a surface roughness of an Ra smaller than 1.2 microns and a gloss smaller than 25%.

DETAILED DESCRIPTION OF THE INVENTION

The surface roughness Ra described means the "Central Line Mean Roughness" which is generally defined in JIS B 0601-1970 and ISO R 468 as follows:

$$Ra = \frac{1}{l} \int_0^l |f(x)|dx$$

wherein l is a sampled length measured in a direction along the central line of the surface roughness characteristic curve which is generally represented by $$Y=f(x)$$

wherein the direction of the central line is the X axis and the longitudinal axis is the Y axis.

The measurement of the surface roughness Ra may be carried out according to JIS B 0601-1970 with use of a direct reading type Ra indicator with a stylus head having a radius of curvature of 5 microns. The surface roughness tester "Surfcom 1013" manufactured by Tokyo Seimitsu Kabushiki Kaisha is one of the useful Ra indicators.

The measuring conditions may be as follows:

Cutoff value: 0.8 mm

Length measured: 2.5 mm

Scanning speed: 0.6 mm/sec

If a paper sheet is used as the base sheet for a heat-sensitive record material according to the invention, the measurement of the Ra value is carried out along a machine direction of the paper sheet.

It has been found that if the surface roughness Ra is larger than 1.2 microns a satisfactorily sharp and clear record image exactly according to the heated dots of the thermal head can no longer be obtained even with any adjustment of pressure of the platen urged to the thermal head. Therefore, it is essential to control the surface roughness Ra of the color developing layer at a value smaller than 1.2 microns. The preferable range of the surface roughness Ra is 1.1 microns to 0.6 microns.

It may be considered that the smaller the value Ra, the more exact and reproducible the thermal printing by heat transfer through the heated dots of the thermal head. However, this assumption is not correct. The inventors have found that in case where the Ra value is extremely small the color image developed by the thermal printing does not always exactly correspond to the heated dots of the thermal head with a result that the adaptability of the record material for processing by a recording machine becomes deteriorated. The inventors have made a further study to improve the thermal printability or adaptability of the heat-sensitive record material and found that the gloss of the surface of the color developing layer of the heat-sensitive material is another important factor to resolve this problem. That is, it has been found that, if the gloss value of the color developing layer surface is greater than 25%, a good and sharp color image exactly according to the heated dots of the thermal head can no longer be obtained even if the surface roughness Ra of the color developing layer is smaller than 1.2 microns. With the gloss value of the color developing layer within this range, the adaptability and printability of the record material for a recording machine also become wrong. Accordingly, it is another essential condition of the invention to control the gloss of the color developing layer of the heat-sensitive record material so as to have a gloss value smaller than 25%, preferably within the range of 20 to 10%. The gloss value may be measured by a conventional reflection type glossmeter at an incident angle of 75°.

The method for the formation of the color developing layer having such a specified surface roughness and such a specified gloss as respectively described in the above is not limited to any particular one. The specified surface roughness and the specified gloss may be obtained by selection of the materials for forming the color developing layer, selection of a proper technique for formation of the color developing layer and/or adaption of a proper after-treatment of the color developing layer.

According to a preferred embodiment of the invention, the above color developing layer may include oil absorptive pigment having an oil absorption larger than 80 ml/100 g, preferably 100 to 400 ml/100 g in combination with inorganic pigment having such a relatively large average particle size as within the range of 6 to 20 microns, preferably within the range of 6 to 15 microns.

The oil absorption of the oil absorptive pigment is measured according to JIS K 5101. Among the useful pigments having an oil absorption within the specified range there may be included the following compounds:

| | Oil absorption (ml/100 g) |
|---|---|
| diatomaceous earth | 110-120 |
| calcined diatomaceous earth | 130-140 |
| flux-calcined diatomaceous earth | 120-160 |
| finely divided aluminum oxide anhydride | 80-250 |
| finely divided titanium oxide | 80-120 |
| magnesium carbonate | 80-150 |
| white carbon | 80-300 |
| finely divided silicon dioxide | 100-300 |
| magnesium aluminosilicate | 300-400 |

The above enumerated compounds may be used either solely or in combination. The oil absorptive pigment may be prepared in the form of finely divided particles having an average particle size smaller than 20 microns. Above all, finely divided silicon dioxide is desirable because an increase of the amount thereof added to the color developing layer has less effect on the lowering of the image density. The oil absorption depends on various factors such as the shape and the diameter of the particles. It may be improved by a chemical or physical treatment so as to be within the above specified range.

As to the inorganic pigment macroparticles to be included in the color developing layer, any inorganic compounds may be used so far as they have a particle size within the above mentioned specified range. Among the useful inorganic compounds, there may be included calcium carbonate, aluminum hydroxide, aluminum oxide, talc and calcined clay.

The amount of each of the oil absorptive pigment and the inorganic pigment in the color developing layer may be changed depending on the composition of the color developing layer, the method of forming the color developing layer and the after-treatment of the color developing layer. Usually, the amount of the oil absorptive pigment described may be within the range of 5 to 80% by weight, preferably within the range of 10 to 60% by weight on dry basis with respect to the total weight of the color developing layer. The amount of the inorganic pigment in the form of macroparticles described may be within the range of 5 to 80% by weight preferably within the range of 10 to 60% by weight on dry basis with respect to the total weight of the color developing layer. In case where the inorganic pigment in the form of macroparticles described is used in combination with the above mentioned oil absorptive pigment, the amount of the inorganic pigment described may be within the range of 20 to 300 parts by weight, preferably within the range of 50 to 200 parts by weight with respect to 100 parts of the oil absorptive pigment used. The oil absorptive pigment may be prepared in the form of macroparticles having an average particle size of 6 to 20 microns. In this case the oil absorptive pigment in the form of macroparticles may be solely used without use of any additional inorganic pigment macroparticles.

Among examples for the combination of color former and acceptor included in the color developing layer according to the invention, there are included the following combinations: (a) basic colorless chromogenic material with inorganic or organic acidic material; (b) metal salt of long chain fatty acid, e.g., ferric stearate, ferric myristate and the like with phenol, e.g., tannic acid, gallic acid and the like; (c) organic metal salt, e.g., nickel acetate, cobalt stearate and the like with metal sulfide, e.g., calcium sulfide, barium sulfide and the like; (d) organic chelate compound, e.g., diphenylcarbazone, thiodiphenylcarbazide and the like with sulfur compound, e.g., sodium thiosulfate, thiourea and the like; (e) metal salt, e.g., iron oxalate, lead acetate and the like with sulfur compound, e.g., sodium tetrathionate, sodium thiosulfate and the like; (f) metal salt, e.g., silver behenate, silver stearate and the like with organic reducing agent, e.g., protocatechuic acid, 4-methoxy-α-naphthol and the like; and (g) Grignard type organic metal compound with sulfur compound.

Among the above combinations, the combination (a) is most preferred because of the superiority in the color developing ability and the image retainability of the record material obtained. For the (a) combination, any of various known colorless chromogenic materials may be used. Among them there are included, by way of examples, triarylmethane derivatives such as 3,3-bis(p-dimethylaminophenyl)-6-dimethylaminophthalide, 3,3-bis(p-dimethylaminophenyl)phthalide and 3-(p-dimethylaminophenyl)-3-(1,2-dimethylindole-3-yl)phthalide; diphenylmethane-derivatives such as 4,4'-bis-dimethylaminobenzhydrylbenzylether, N-halophenyl-leucoauramine and N-2,4,5-trichlorophenyl-leucoauramine; fluoran derivatives such as 7-diethylamino-3-chlorofluoran, 7-diethylamino-3-chloro-2-methylfluoran, and 2-phenylamino-3-methyl-6-(N-ethyl-N-p-tolyl-)amino-fluoran; thiazine derivatives such as benzoyl-leuco-methyleneblue and p-nitrobenzyl-leucomethylene blue; and spiro-compounds such as 3-methyl-spiro-dinaphtopyrane, 3-ethyl-spiro-dinaphthopyrane and 3-propyl-spiro-dibenzopyrane.

Any of various known acidic material as acceptor may be used for the present invention. Among them there are included inorganic acid materials such as acid clay, activated clay, attapulgite, silica, zeolite, bentonite and aluminum silicate, and organic acid materials such as phenolic compounds, e.g., 4-tert-butylphenol, 4-hydroxydiphenoxide, α-naphthol, β-naphthol, 4-hydroxyacetophenol, 4-tert-octylcatechol, 2,2'-dihydroxydiphenol, 2,2'-methylene-bis(4-methyl-6-tert-isobutylphenol), 4,4'-isopropylidene-bis-(2-tert-butyl-phenol), 4,4'-sec-butylidenediphenol, 4-phenylphenol, 4,4'-isopropylidenediphenol, 2,2'-methylene-bis(4-chlorophenol), hydroquinone, 4,4'-cyclohexylidenediphenol, novolak phenol resin and other phenol polymer; aromatic carboxylic acids, e.g., benzoic acid, p-tert-butylbenzoic acid, terephthalic acid, 3-sec-butyl-4-hydroxybenzoic acid, 3-cyclohexyl-4-hydroxybenzoic acid, 3,5-dimethyl-4-hydroxybenzoic aicd, salicylic acid, 3-isopropylsalicylic acid, 3-tert-butylsalicylic acid, 3-benzylsalicylic acid, 3-(α-methylbenzyl)-salicylic acid, 3-chloro-5-(α-methylbenzyl)salicylic acid, 3,5-di-tert-butylsalicylic acid, 3-phenyl-5-(α,α-dimethylbenzyl)salicylic acid and 3,5-di-α-methylbenzylsalicylic acid; and salts of the above mentioned phenolic compounds and aromatic carboxylic acids with polyvalent metal, e.g., zinc, magnesium, aluminum, calcium, titanium, manganese, tin and nickel.

The above enumerated acceptors may be used solely or in combination.

There is no special limitation about the composition ration of the color former and the acceptor. In case where the combination of a basic colorless chromogenic material with an acidic material is used, the amount of the acceptor is usually within the range of 1 to 50 parts by weight, preferably 4 to 10 parts by weight, per one part by weight of a colorless chromogenic material. Each of the color former and the acceptor may be included in the coating composition in the form of finely divided particles having an average diameter smaller than 5 microns.

A binder such as starches, hydroxyethylcellulose, methylcellulose, carboxymethylcellulose, gelatin, casein, gum arabic, polyvinyl alcohol, salts of styrene-maleic anhydride copolymers, styrene-butadiene copolymer emulsion, vinylacetate-maleic anhydride copolymer emulsion and salts of polyacrylic acid may be used in an amount of 10 to 40% by weight, preferably 15 to 30% by weight with respect to the total solid amount.

In the coating composition various additives may also be added. Among the additives, for example, there are included dispersing agents such as sodium dioctylsulfosuccinate, sodium dodecylbenzenesulfonate, laurylsulfuric acid sodium salt and metal salts of fatty acid; ultraviolet ray absorbing agents such as benzophenone derivatives and triazol derivatives; sensitivity regulators such as stearic acid amide, palmitic acid amide and 2,6-diisopropylnaphthalene in order to improve color sensitivity at low temperature; parting agents such as zinc stearate and aluminum stearate; fluorescent dyes and coloring dyes.

As for the base sheet, paper, plastic film, synthetic paper, woven fabric sheet and moldings may be used, but paper is used most preferably from the standpoint of cost, aptitude for coating, etc. Further, the amount of coating composition applied to form a color developing layer, though not particularly limited, usually is 2–15 $g/m^2$, preferably 3–12 $g/m^2$ by dry weight.

The color developing layer is formed by coating a base sheet with the coating composition including the above mentioned ingredients. The blade coating, especially, of a bend type, is preferred. The blade coating is known as a proper coating technique for making up depressions of a rough surface to form a flat and smooth surface. However, it has heretofore been considered that the blade coating is not proper for a coating composition including oil absorptive pigment and inorganic pigment macroparticles having an average diameter of 6 to 20 microns because of lack of a sufficient fluidity and the possibility of producing streaks and scratches. Contrary to this assumption, it has been found that those apprehensions are groundless in addition to the fact that the blade coating technique is quite proper and effective for forming the color developing layer having the specified surface roughness and the specified gloss according to the invention.

The color developing layer thus formed is then subjected to a surface treatment as by using a calender or supercalender within such an extent that the desired surface roughness and gloss can be obtained.

DETAILED DESCRIPTION OF THE PREFERRED EMBODIMENT

The following examples serve to illustrate the invention in more detail although the invention is not limited to the examples. Unless otherwise indicated, parts and % signify parts by weight and % by weight, respectively.

EXAMPLE 1

(1) Preparation of A liquid:

The following composition was passed through a sand grinder.

| | |
|---|---|
| 2-phenylamino-3-methyl-6-(N—ethyl-N—p-tolyl)aminofluoran | 25 parts |
| stearic acid amide | 40 parts |
| 25% aqueous solution of a sodium salt of styrene-acrylic acid copolymer (Polymalone 356 manufactured by Arakawa Kagaku Kabushiki Kaisha) | 26 parts |
| dioctyl sodium sulfosuccinate (Rapyzol B 80 manufactured by Nippon Oils and Fats Company Limited) | 4 parts |
| water | 140 parts |

Pulverization was continued until an average particle size of 3 microns.

(2) Preparation of B liquid:

| | |
|---|---|
| 4,4'-isopropylidenediphenol | 100 parts |
| stearic acid amide | 60 parts |
| 25% aqueous solution of a sodium salt of styrene-acrylic acid copolymer (Polymalone 356 manufactured by Arakawa Kagaku Kabushiki Kaisha) | 64 parts |
| dioctyl sodium sulfosuccinate (Rapyzol B 80 manufactured by Nippon Oils and Fats Company Limited) | 6 parts |
| water | 350 parts |

Pulverization was continued until an average particle size of 3 microns.

(3) Making a heat-sensitive record material:

150 parts of amorphous silicon oxide (Carplex #80 manufactured by Shionogi & Co., Ltd., which had an oil absorption of 230 ml/100 g and an average particle size of 8 microns was slowly added to the above B liquid to obtain a dispersion. Subsequently, 280 parts of 25% aqueous solution of a sodium salt of styrene-maleic acid copolymer (Polymalone 353 manufactured by Arakawa Kagaku Kabushiki Kaisha) and 235 parts of A liquid were added to the dispersion to prepare a coating composition which had a solid content of 37.5% and a viscosity of 600 cps.

The coating composition was coated on a base sheet of 50 g/$m^2$ in the weight of an amount of 8 g/$m^2$ on dry basis with a bend type blade coater under the conditions of a blade thickness of 0.4 mm, a blade angle of 23° and a coater speed of 350 m/min and then dried. A super calender was lightly applied to the obtained coated sheet to obtain a heat-sensitive record material, the color developing layer of which had a surface roughness Ra of 1.0 micron and a gloss value of 16%.

Control 1

615 parts of water was added to the coating composition prepared in the same manner as in Example 1 to prepare a coating composition which had a solid content of 25% and a viscosity of 100 cps. The coating composition was coated on a base sheet of 50 g/$m^2$ in the weight of an amount of 8 g/$m^2$ on dry basis with an air knife coater under the conditions of a wind pressure of 140 mmHg and a coater speed of 200 m/min and dried. A super calender was lightly applied to the coated sheet to obtain a heat-sensitive record material the color developing layer of which had a surface roughness Ra of 2.0 microns and a gloss value of 17%.

Control 2

Example 1 was repeated except that 400 parts of kaolin (UW-90 manufactured by EMC Co., Ltd.) was used instead of 150 parts of amorphous silicon oxide to prepare a coating composition. The coating composition was coated in the same manner as in Example 1 and dried. A super calender was lightly applied to the coated sheet to obtain a heat-sensitive record material the color developing layer of which had a surface roughness Ra of 1.2 microns and a gloss value of 35%.

The properties of thus obtained three heat-sensitive record materials were examined. Namely, a chart of image electron society was continuously recorded on the heat-sensitive record materials with the use of practical heat-sensitive facsimile (Panafax 7000 manufactured by Matsushita Denso Kabushiki Kaisha) and the adhesion or piling of scums on the thermal head and the sticking were checked. Further, the accuracy of dot-printing was examined by a microscope. As to the heat-sensitive record material prepared in Example 1, the piling of scums and sticking were not found and clear images superior in the accuracy of dot-printing were obtained. However, although the heat-sensitive record material prepared in Control 1 was stable in the machinability, the accuracy of dot-printing was very bad and unclear images were only obtained. As to the heat-sensitive record material obtained in Control 2, the adhesion of scums on the thermal head was recognized and the color density of the recorded images was decreased. A sticking noize occured and the machinability was very bad. Additionally, the color developing surface obtained in Control 2 was very high in the gloss value and unnatural.

EXAMPLE 2

(1) Preparation of A liquid:

The following composition was passed through a sand grinder.

| | |
|---|---|
| 2-anilino-3-methyl-6-(N—ethyl-p-toluidino)-fluoran | 100 parts |
| stearic acid amide emulsion (Celozol 2M manufactured by Chukyo Oils and Fats Company Limited, in which a solid content was 20%) | 400 parts |
| 6% aqueous solution of methylcellulose | 166 parts |
| water | 33 parts |

Pulverization was continued until an average particle size of 3 microns.

(2) Preparation of B liquid:

| | |
|---|---|
| 4,4'-cyclohexylidenediphenol | 230 parts |
| stearic acid amide emulsion | 600 parts |
| aqueous solution of methylcellulose | 166 parts |
| water | 33 parts |

Pulverization was continued until an average particle size of 3 microns.

(3) Making a heat-sensitive record material:

550 parts of amorphous silicon oxide (E-100 manufactured by Nippon Silica Co., Ltd. which had an oil absorption of 200 ml/100 g and an average particle size of 5 microns was dispersed in the above B liquid. To the dispersion, 40 parts of aluminum hydroxide (Hyzilite H-32 manufactured by Showa Denko Kabushiki Kaisha which had a particle size of 15 microns), 500 parts of 10% aqueous solution of polyvinylalcohol, 500 parts of a 20% aqueous solution of oxidized starch and then 300 parts of styrene-butadiene copolymer latex (JSR 0692 manufactured by Nippon Synthetic Rubber Co., Ltd., which had a solid content of 50%) were successively added. Further, 699 parts of A liquid was mixed to the resultant aqueous system to prepare a coating composition. The coating composition had a solid content of 39.8% and a viscosity of 1100 cps.

The coating composition was coated on a base sheet of 50 $g/m^2$ in the weight of an amount of 8 $g/m^2$ on dry basis with a bend type blade coater under the conditions of a blade thickness of 0.4 mm, a blade angle of 29°, and a coater speed of 200 m/min and then dried to obtain a heat-sensitive record material. The record material was lightly super-calendered to obtain a heat-sensitive record material in which the color developing layer had a surface roughness Ra of 1.1 microns and a gloss value of 15%.

Control 3

2150 parts of water added to the coating composition obtained in Example 2 to prepare a coating composition, which had a solid content of 25% and a viscosity of 150 cps. The coating composition was coated on a base sheet of 50 $g/m^2$ in the weight of an amount of 8 $g/m^2$ on dry basis with an air-knife-coater under the conditions of a wind-pressure of 150 mmHg and a coater speed of 150 m/min. The resultant coated material was super-calendered to prepare a heat-sensitive record material in which the color developing layer had a surface roughness Ra of 2.1 microns and a gloss value of 15%.

The properties of thus obtained two heat-sensitive record materials were examined in the same manner as in Example 1. As to the adhesion of scums and the sticking, each of them did not have any problem but the heat-sensitive record material obtained in Control 3 was bad in the accuracy of dot-printing and only rough color images were obtained.

What we claim is:

1. In a heat-sensitive record material comprising a base sheet and a color developing layer formed on at least one surface of said base sheet, said color developing layer comprising color former and acceptor which is reactive with said color former to develop a color, the improvement in said color developing layer including oil absorptive pigment having an oil absorption larger than 80 ml/100 g and inorganic pigment having an average particle size within the range of 6 to 15 microns, said oil absorptive pigment being a member selected from the group consisting of diatomaceous earth, calcined diatomaceous earth, flux calcined diatomaceous earth, finely divided aluminium oxide anhydride, finely divided titanium oxide, magnesium cabonate, white carbon, finely divided silicon dioxide, magnesium aluminosilicate and mixtures of the foregoing, said inorganic pigment being a member selected from the group consisting of calcium carbonate, aluminium hydroxide, aluminum oxide, talc, calcined clay and mixtures of the foregoing, and said color developing layer having a surface roughness of an Ra smaller than 1.2 microns and a gloss smaller than 25%.

2. A heat-sensitive record material as defined in claim 1, in which the surface roughness Ra of said color developing layer is within the range of 1.1 microns to 0.6 microns.

3. A heat-sensitive record material as defined in claim 1, in which the gloss of said color developing layer surface is within the range of 20 to 10%.

4. A heat-sensitive record material as defined in claim 1, in which the oil absorption of said oil absorptive pigment is within the range of 100 to 400 ml/100 g.

5. A heat-sensitive record material as defined in claim 1, in which the amount of said oil absorptive pigment is within the range of 5 to 80% by weight with respect to the total weight of said color developing layer and the amount of said inorganic pigment is within the range of 20 to 300 parts by weight with respect to 100 parts of said oil absorptive pigment.

6. A heat-sensitive record material as defined in claim 5, in which the amount of said inorganic pigment is within the range of 50 to 200 parts by weight with respect to 100 parts of said oil absorptive pigment.

* * * * *